W. J. DALBY.
APPARATUS FOR FACILITATING THE SUPPLY OF OIL TO ENGINES OF MOTOR CARS OR OTHER ENGINES
APPLICATION FILED NOV. 7, 1919.
1,364,726.
Patented Jan. 4, 1921.
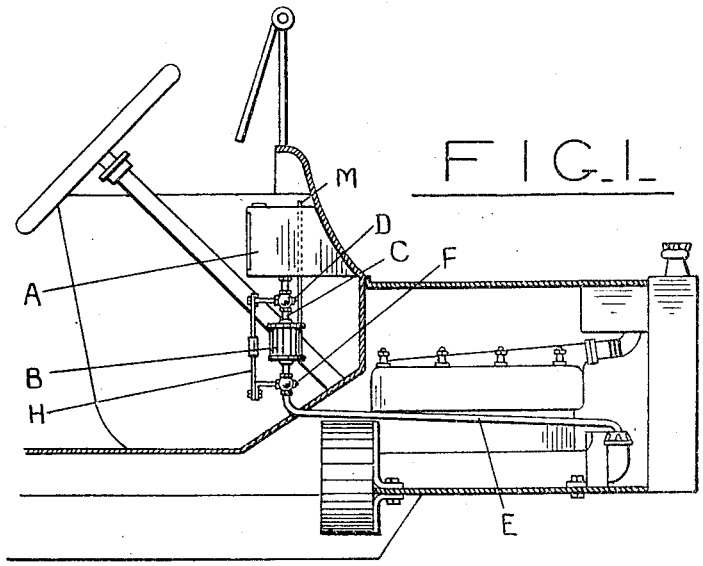
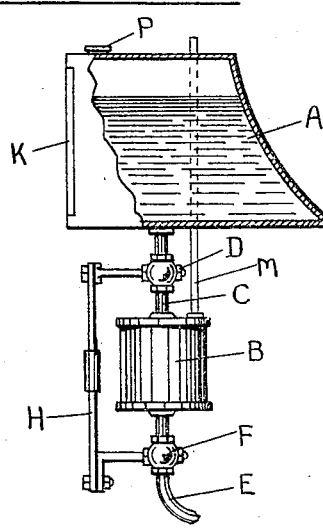
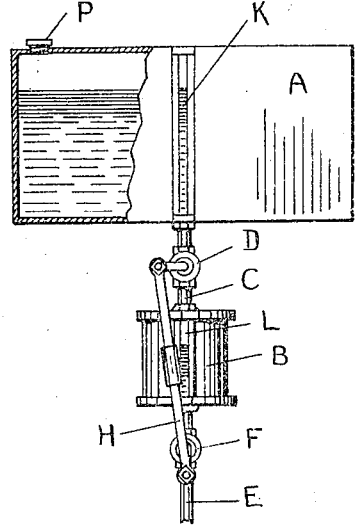
INVENTOR
WILLIAM JAMES DALBY.
BY
ATTORNEYS.

UNITED STATES PATENT OFFICE.

WILLIAM JAMES DALBY, OF MAGILL, SOUTH AUSTRALIA, AUSTRALIA.

APPARATUS FOR FACILITATING THE SUPPLY OF OIL TO ENGINES OF MOTOR-CARS OR OTHER ENGINES.

1,364,726.   Specification of Letters Patent.   Patented Jan. 4, 1921.

Application filed November 7, 1919. Serial No. 336,456.

*To all whom it may concern:*

Be it known that I, WILLIAM JAMES DALBY, a subject of the King of Great Britain and Ireland, residing at No. 10 Orient road, Magill, State of South Australia, Commonwealth of Australia, have invented a certain new and useful Apparatus for Facilitating the Supply of Oil to Engines of Motor-Cars or other Engines, of which the following is a specification.

This invention has been designed to simplify the procedure of supplying lubricating oil in predetermined quantities to the engine of a motor car. It comprises an arrangement of two tanks or receivers positioned one above the other, the upper one to contain the main supply of oil and the lower one of size to contain the predetermined quantity of oil for the one oiling, and the lower one to be provided with upper and lower taps, the upper tap being in a pipe connection between the two receivers and the lower tap being in a pipe connection between the lower receiver and the breather cap or such other part of the engine as will insure a free flow of the oil to the sump of the engine. The two taps preferably are connected by a rod or other device so that when one is opened the other is closed and vice versa, but while this is advisable it is not absolutely necessary. The taps may be operated independently of one another by hand if preferred.

In order that my invention may be clearly understood I will describe the same with reference to the accompanying drawings in which—

Figure 1 shows my invention fitted to a motor car, the car body being shown in section. The position of the two receivers is shown approximately. In practice they will be fitted where most convenient according to the construction of the car and the position of other fittings on the dashboard.

Figs. 2 and 3 are side view and front view respectively drawn to a larger scale showing my invention detached, the upper receiver being shown partly in section.

In the drawing A represents the upper receiver to contain the main supply of oil and which is shown as secured against the front of the car to the right of the steering post, and B represents the lower receiver of size to contain the predetermined quantity of oil for the one oiling. The receiver B is connected to the receiver A by a pipe C in which is a tap D. To the bottom of the receiver B is connected a pipe E which leads to the breather cap of the engine, and in this pipe is a tap F. The lower receiver is attached so that its lowest point is slightly above the breather cap.

The upper tap D and the lower tap F are connected by a rod H as shown more distinctly in Fig. 3 so that when the one is closed the other is opened. Assuming tap D to be closed and the tap F open it will be evident that when the rod H is moved upward the tap D will be opened and the tap F closed simultaneously.

The receiver A is fitted with a glass gage K to show the height of the oil therein and the receiver B is fitted with a glass gage L to show the oil level therein. The lower receiver B is provided also with an air pipe M rising from its top to a point above the top of the upper receiver. The upper receiver A is fitted with a screw-cap P to enable it to be filled with oil.

Normally the tap D above the lower receiver B is closed and the tap F below it is open so that the oil can flow from such receiver through the breather cap to the engine, the place of the oil within the receiver being taken by air which passes down the airpipe M. When it is required to fill the lower receiver B the upper tap D is opened and the lower tap F closed simultaneously and the oil flows from the upper receiver to the lower and fills the same, air passing out through the airpipe M. When the receiver B has been filled the taps are operated, the upper one being closed and the lower one opened and the oil passes from the receiver B to the engine.

What I claim as my invention is—

Means for supplying lubricating oil in measured quantity to the engine of a motor car, the same comprising an upper receiver for holding the oil in bulk, a lower receiver for containing the predetermined quantity of oil to be fed to the engine at each operation, a valved connection between the two receivers, a valved connection between the lower receiver and the engine, connecting means between the valves of the two connections, and an air pipe extending from the top of the lower receiver to a point above the upper receiver.

In testimony that I claim the foregoing as my invention I have signed my name in the presence of two subscribing witnesses this 30th day of September, 1919.

WILLIAM JAMES DALBY.

Witnesses:
ARTHUR GORE COLLISON,
KATHLEEN MARY COLLISON.